United States Patent [19]
McBride

[11] 3,790,193
[45] Feb. 5, 1974

[54] COMBINATION STATEMENT AND CHECK AND METHOD OF MAKING A NEGOTIABLE CHECK

[76] Inventor: Robert L. McBride, 1300 Woodhollow, Houston, Tex. 77027

[22] Filed: Oct. 26, 1971

[21] Appl. No.: 192,230

[52] U.S. Cl............... 283/57, 283/58, 235/61.12 R
[51] Int. Cl........................................... B42d 15/00
[58] Field of Search.......... 283/57, 58; 235/61.12 R, 235/61.12 M, 61.12 N

[56] References Cited
UNITED STATES PATENTS

| | | | |
|---|---|---|---|
| 1,946,751 | 2/1934 | McCarthy | 283/58 |
| 2,985,464 | 5/1961 | McFarland | 283/58 |
| 3,363,917 | 1/1968 | Gunderson et al. | 283/58 |
| 1,608,294 | 11/1926 | Beman | 283/58 |
| 3,531,628 | 9/1970 | White | 235/61.12 R |

Primary Examiner—Lawrence Charles
Attorney, Agent, or Firm—Zarley, McKee & Thomte

[57] ABSTRACT

A statement includes an overlay check detachably connected thereto along a fold line. The check overlay is folded into overlapping relationship on the statement and an end guide flap extends upwardly adjacent the end of the check overlay. A complete check form is placed between the check overlay and the statement against the end flap and fold line. The overlay is pressed into engagement with the check form to permanently bond the two adhesively together. The check overlay includes in machine readable indicia amount, date, payer and payee information and the complete check form has payer account identification and check form number exposed. The assembled check is separated from the statement by the check being torn along the fold line. The check overlay may include a detachable marginal portion which includes the payer's account identification and check number such that the check overlay becomes a complete check in and of itself and needs no separate check form.

3 Claims, 6 Drawing Figures

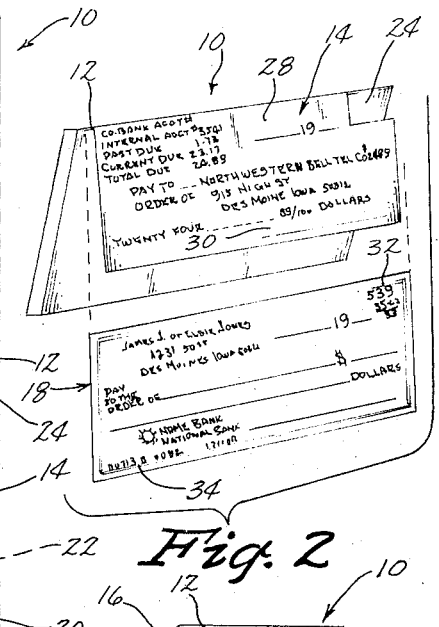

COMBINATION STATEMENT AND CHECK AND METHOD OF MAKING A NEGOTIABLE CHECK

The business communities' relationship with its customers in terms of sending statements and remitting payment has remained substantially the same for many years. Each customer upon receipt of a bill or statement completes his personal check taking information from the statement. The date, payee's name, check amount and payer's signature are written in on the check form by the customer.

The combination statement and check and method of making a negotiable check of this invention involves substantially having the check prepared by the payee in machine readable indicia such that the customer only needs to fill in the date and sign his name to the check. A statement is supplied to the customer with a check overlay detachably secured along a fold line. The check overlay includes the payee's name and check dollar amount leaving only the signing and the dating of the check for the customer. The customer's conventional check form is placed between the statement and the check overlay against the end flap and fold line. Backing paper on the bottom of the check overlay is removed exposing adhesive and thus the check overlay is pressed into permanent bonded engagement with the check form. The check overlay is then severed from the statement leaving a statement for the customer's records and a completed check ready to be mailed back to the payee.

Alternatively, the check attached to the statement can include a marginal portion having the check number and customer's account identification thereon. The marginal portion would be detachably connected to the check overlay such that the check overlay with the marginal portion could function as a complete check thus not requiring a conventional check form. The use of the conventional check form allows the customer to retain consecutive numbering of his checks and avoids the requirement that the payee know the customer's bank account number. A further optional arrangement is to have the check overlay include the payee's name and the dollar amount information on transparent material such that the remaining information is seen through the check overlay on the conventional check form secured to and under the check overlay.

The use of the check system of this invention will expedite the preparing of the check by the customer, the processing of the check by the transfer banks and the reconciling of the payment by the payee.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a view of the statement and check overlay as prepared by the payee and received by the customer;

FIG. 2 is a perspective view showing the statement and check overlay folded into overlapping relationship to receive a conventional check form therebetween for bonding the check overlay to the conventional check form;

FIG. 3 is a fragmentary perspective view showing the statement and check overlay functioning as a indexing device allowing the check overlay to be bonded to the conventional check form;

FIG. 4 is a plan view of the assembled check comprising a check overlay bonded to a conventional check form;

FIG. 5 is a plan view of the check overlay functioning as a complete check in and of itself; and FIG. 6 is a plan view of a return mailing envelope having a window therein for exposing the payee's name and address on the check overlay.

As seen in FIG. 1, a statement 10 is detachably connected along a fold line 12 to a check overlay 14. The statement 10 includes an end flap 16, as seen in FIG. 3, which is positioned adjacent the overlay 14 when in overlapping relationship on the statement such that it functions as an indexing device, as seen in FIG. 2, to receive a conventional check form 18. The overlay check 14 includes a marginal portion 20 detachably connected to the check overlay 14 along a separation line 22. The marginal portion 20 includes a space 24 for a check number and a lower marginal space for the payer's bank account number 26.

It is seen in FIG. 1 that the check overlay 14 and margin portion 20, as presented to the customer, require only the date blank 28 and payee's signature line 30 be filled in to provide a negotiable instrument.

The customer, upon receipt of the combined statement and check overlay, will insert his check 18 between the two, as seen in FIG. 2, up against the end guide flap 16 and the fold line 12 such that the check number 32 and the bank identification number 34 are exposed. The marginal portion 20 is previously removed when the customer's personal check is used with the overlay 14, as seen in FIGS. 2 - 4. Adhesive is provided on the back of the check overlay 14 and backing material is then removed to expose the adhesive to the check 18 such that the two may be bonded together to provide a negotiable check 35, as seen in FIG. 4. Thus it is seen that the check overlay 14 of FIG. 1 provides the amount, date, payer and payee information, while the customer's personal check 18 supplies the check number 32 and the bank account identification information 34. A marginal edge 36 on the check form 18 extends along opposite ends and the bottom side of the negotiable check 35.

An optional procedure is to utilize the marginal portion 20 extending around the ends and lower side of the check overlay 14, thus requiring the customer to only fill in the date space 28 and the signature line 30 and then sever the negotiable check 40 from the statement 10, as seen in FIG. 5. The customer may, additionally, place a check number 42 in the upper right-hand corner space 24. The separation line 22 and the fold line 12 are each perforated to facilitate separation of adjacent parts.

Finally, the negotiable checks 35 and 40 having the payee's name and address pretyped thereon may be placed into an envelope 50 having a window 52 thus making it unnecessary to address the envelope. If a stamp is provided by the payee the customer need only seal the flap to complete the check-writing transaction.

If desired, the check overlay 14 may have the dollar amount and payee's name and address located such that it will overlie the appropriate blanks on a conventional check form 18 such that the check overlay may be made from transparent material allowing the information on the check form 18 to be visible.

It is seen that bank processing of the check could be expedited if the payee's account number identification on the check is utilized. Machine reading of the check would allow automatic crediting of the payee's account while debiting the payer's account. Using conventional bookkeeping methods and the preprinted check of this invention will facilitate reconciling the customer's payment with the statement he has been sent since the face of the check includes information concerning his account balance.

I claim:

1. The method of making a check comprising, taking a statement having a check overlay detachably connected thereto along a fold line, folding said check overlay into overlapping relationship onto said statement such that an end guide flap extends upwardly adjacent the end of said check overlay, placing a complete check form between said statement and said check overlay with one end and the top side of said check form engaging said guide flap and said fold line respectively, applying pressure to said check overlay to cause said check overlay to be adhesively secured to said check form, and severing from said statement said check overlay and check form bonded together.

2. The method of claim 1 wherein said check overlay includes amount, date, and payer and payee information and said check form includes the payer's account identification and check number exposed outside of said check overlay.

3. The method of claim 2 including the step of signing and dating said check overlay prior to negotiating said check.

* * * * *